(12) United States Patent
Chen et al.

(10) Patent No.: US 8,989,476 B2
(45) Date of Patent: Mar. 24, 2015

(54) DEVICE FOR AUTOMATICALLY RAPIDLY ANALYZING BIOLOGICAL CELLS AND RELATED METHOD THEREOF

(71) Applicants: Hsian-Chang Chen, New Taipei (TW); Chun-Shui Huang, Tainan (TW)

(72) Inventors: Hsian-Chang Chen, New Taipei (TW); Chun-Shui Huang, Tainan (TW)

(*) Notice: Subject to any disclaimer, the term of this patent is extended or adjusted under 35 U.S.C. 154(b) by 256 days.

(21) Appl. No.: 13/769,835

(22) Filed: Feb. 19, 2013

(65) Prior Publication Data

US 2014/0029834 A1    Jan. 30, 2014

(30) Foreign Application Priority Data

Jul. 27, 2012  (TW) .............................. 101127200 A

(51) Int. Cl.
G06K 9/00  (2006.01)
(52) U.S. Cl.
CPC ........ *G06K 9/00127* (2013.01); *G06K 9/00973* (2013.01)
USPC .......................................... 382/133; 382/134
(58) Field of Classification Search
None
See application file for complete search history.

(56) References Cited

U.S. PATENT DOCUMENTS

| | | | | |
|---|---|---|---|---|
| 6,546,123 | B1* | 4/2003 | McLaren et al. | 382/128 |
| 8,088,715 | B2* | 1/2012 | Bodmer et al. | 506/9 |
| 2005/0185832 | A1* | 8/2005 | Douglass et al. | 382/133 |
| 2006/0072805 | A1* | 4/2006 | Tsipouras et al. | 382/134 |
| 2007/0053569 | A1* | 3/2007 | Douglass et al. | 382/128 |
| 2007/0159627 | A1* | 7/2007 | Johnson | 356/335 |
| 2008/0112606 | A1* | 5/2008 | Lee et al. | 382/133 |
| 2009/0060303 | A1* | 3/2009 | Douglass et al. | 382/128 |
| 2009/0274360 | A1* | 11/2009 | Suzuki et al. | 382/133 |
| 2009/0279770 | A1* | 11/2009 | Weller, III | 382/133 |
| 2010/0025336 | A1* | 2/2010 | Carter et al. | 210/740 |
| 2010/0128961 | A1* | 5/2010 | Kalusche | 382/133 |
| 2011/0070606 | A1* | 3/2011 | Winkelman et al. | 435/39 |
| 2011/0249137 | A1* | 10/2011 | Suzuki et al. | 348/222.1 |

(Continued)

FOREIGN PATENT DOCUMENTS

TW    I324750    5/2010

OTHER PUBLICATIONS

Yu-Pin Huang, "Establishment of Microscopic Image Analysis System for Quantification of Cellular Static and Dynamic Characteristics", Southern Taiwan University of Science and Technology master thesis, cover page, abstract, p. 1-2, p. 6, p. 63-65, and p. 75-79, Jul. 2006.

(Continued)

*Primary Examiner* — Daniel Mariam
*Assistant Examiner* — Thomas A James
(74) *Attorney, Agent, or Firm* — Winston Hsu; Scott Margo

(57) ABSTRACT

A method for automatically rapidly analyzing biological cells includes continuously capturing a plurality of image frames of a suspension including a plurality of biological cells according to a predetermined time interval within a predetermined time using a low-magnification optical image amplification device of a image capture device; transmitting each of the plurality of image frames to an operation processing device; the operation processing device utilizing an image identification technology to detect a number of the plurality of biological cells in an image frame and a static data of each biological cell of the plurality of biological cells according to at least one parameter; and the operation processing device generating a dynamic data of each biological cell in the image frame according to the static data of each biological cell in the image frame and the static data of each biological cell of a previous image frame.

28 Claims, 4 Drawing Sheets

(56) References Cited

U.S. PATENT DOCUMENTS

| | | | |
|---|---|---|---|
| 2011/0268342 A1* | 11/2011 | Lee et al. | 382/133 |
| 2012/0046203 A1* | 2/2012 | Walsh et al. | 506/39 |
| 2012/0134571 A1* | 5/2012 | Ito et al. | 382/133 |
| 2012/0275671 A1* | 11/2012 | Eichhorn et al. | 382/128 |
| 2013/0070077 A1* | 3/2013 | Winkelman et al. | 348/79 |
| 2013/0071003 A1* | 3/2013 | Wirtz et al. | 382/133 |
| 2013/0279788 A1* | 10/2013 | Zahniser et al. | 382/134 |
| 2013/0314526 A1* | 11/2013 | Yasuda et al. | 348/79 |
| 2013/0315466 A1* | 11/2013 | Drell | 382/133 |
| 2014/0072955 A1* | 3/2014 | Callahan et al. | 435/3 |

OTHER PUBLICATIONS

Chien-Chuan Ko et al., "The Study on Somatic Cell Count of Raw Milk Using Image Processing", Journal of Agricultural Machinery vol. 8, No. 4, Dec. 1999.

* cited by examiner

DEVICE FOR AUTOMATICALLY RAPIDLY ANALYZING BIOLOGICAL CELLS AND RELATED METHOD THEREOF

BACKGROUND OF THE INVENTION

1. Field of the Invention

The present invention relates in general to a device and a method for automatically rapidly analyzing biological cells, and in particular to a device and a method for automatically rapidly analyzing biological cells utilizing a low-magnification optical image amplification device and an image capture device to continuously capture a plurality of image frames of biological cells for sampling.

2. Description of the Prior Art

Generally, the conventional methods for cell counting are classified into manual counting, capacitance/resistance counting, turbidity/scattering rate colorimetric counting, image identification counting. The details are as follows.

Manual counting: the measurer places the suspension including target biological cells in a special container, and counts the target biological cells by naked eyes through an optical magnification device (e.g. microscope). But, if there are too many target biological cells in the field of view, the target biological cells in the field of view are moving, or there are other non-target biological cells mixed in the field of view, the measurer may be hard to identify the target biological cells, or even may not identify the target biological cells. In addition, observing for a long time may cause eyestrain for measurer and affect the result of cell counting.

Capacitance/resistance counting: the measurer uses special reagent to remove non-target biological cells in the suspension including target biological cells, and introduces the diluted suspension into a tiny pipe charged with electricity and makes the target biological cells pass through a powered microcavity electrode. When the target biological cells pass through the powered microcavity electrode, the voltage/resistance/capacitance of the powered microcavity electrode may be changed. The measurer determines the number and the size of the target biological cells according to the change of the powered microcavity electrode. However, because of the influence of the special reagent and electric current, all the target biological cells in the suspension will die. Thus, capacitance/resistance counting method cannot trace the moving/active state of the target biological cells.

Turbidity/scattering rate colorimetric counting: the measurer places the suspension including target biological cells in a transparent container, and illuminates the suspension by light. The transmittance of the suspension illuminated by light may be changed due to the turbidity of the suspension. When the turbidity of the suspension is high, the number of the biological cells in the suspension is more; when the turbidity of the suspension is low, the number of the biological cells in the suspension is less. In addition, the scattering change rate of turbidity may be also used to measure the moving/active state of living biological cells. But turbidity/scattering rate colorimetric counting method is based on liquid with known turbidity to count the number of the biological cells in the suspension. Thus, the counting result of turbidity/scattering rate colorimetric counting is not the real number of the biological cells. Additionally, if the suspension contains non-target biological cells or other impurities, turbidity/scattering rate colorimetric counting will be interfered easily to cause error counting and error active state detection.

In summary, for the measurer, the conventional methods for cell counting are not a good choice.

SUMMARY OF THE INVENTION

An embodiment of the present invention provides a method for automatically rapidly analyzing biological cells. The method comprises continuously capturing a plurality of image frames of a suspension including a plurality of biological cells according to a predetermined time interval within a predetermined time using a low-magnification optical image amplification device of a image capture device; transmitting each of the plurality of image frames to an operation processing device; the operation processing device utilizing an image identification technology to detect a number of the plurality of biological cells in an image frame of the plurality of image frames and a static data of each biological cell of the plurality of biological cells according to at least one parameter; the operation processing device generating a dynamic data of each biological cell in the image frame according to the static data of each biological cell in the image frame and the static data of each biological cell in a previous image frame; the operation processing device generating a dynamic changes history of an appearance of a biological cell image due to coming into view or coming into a focal plane and a disappearance of the biological cell image due to out of view or out of the focal plane according to the dynamic data of each biological cell.

Another embodiment of the present invention provides a method for automatically rapidly analyzing biological cells. The method comprises continuously capturing a plurality of image frames of a suspension including a plurality of biological cells according to a predetermined time interval within a predetermined time using a low-magnification optical image amplification device of a image capture device; transmitting each of the plurality of image frames to an operation processing device; the operation processing device dividing an image frame into a plurality of image blocks; the operation processing device utilizing an image identification technology to detect a number of biological cells in each image block of the plurality of image blocks according to at least one parameter; the operation processing device calculating an average value, a standard deviation and a coefficient of variation of the number of the biological cells in all image blocks according to the number of the biological cells in all image block of the image frame; the operation processing device generating a data of agglutination of the biological cells in the image frame according to the coefficient of variation and a difference between the number of the biological cells in each image block and the average value plus one or a plurality of the standard deviation.

Another embodiment of the present invention provides a device for automatically rapidly analyzing biological cells. The device comprises an image capture device and an operation processing device. The image capture device comprises a low-magnification optical image amplification device, wherein the image capture device is configured to utilize the low-magnification optical image amplification device to continuously capture a plurality of image frames of a suspension including a plurality of biological cells according to a predetermined time interval within a predetermined time. The operation processing device is configured to utilize an image identification technology to detect a number of the plurality of biological cells in an image frame of the plurality of image frames and a static data of each biological cell of the plurality of biological cells according to at least one parameter, generate a dynamic data of each biological cell in the image frame according to the static data of each biological cell in the image frame and the static data of each biological cell in a previous image frame, and generate a dynamic changes history of an appearance of a biological cell image due to coming into view or coming into a focal plane and a disappearance of the biological cell image due to out of view or out of the focal plane according to the dynamic data of each biological cell. The image capture device is further configured to transmit the image frame to the operation processing device.

The present invention provides a device for automatically rapidly analyzing biological cells and a method for automatically rapidly analyzing biological cells. The device and the method utilize a low-magnification optical image amplification device of an image capture device to continuously capture a plurality of image frames of a suspension including biological cells according to a predetermined time interval within the predetermined time, and utilize an image identification technology to detect a number of the plurality of biological cells in each image frame of the suspension and a static data of each biological cell of the plurality of biological cells according to at least one parameter. An operation processing device may generate a dynamic data of each biological cell in an image frame of the suspension according to the static data of each biological cell in each image frame of the suspension and the static data of each biological cell in a previous image frame of the suspension, or the operation processing device calculates an average value, a standard deviation and a coefficient of variation of the number of the biological cells in all image blocks according to the number of the biological cells in each image block of the image frame of the suspension. Then, the operation processing device may determine whether the biological cells in each image block agglutinate according to the coefficient of variation and the comparison between the number of the biological cells in each image block and the average value plus one or a plurality of the standard deviation.

Compared with prior art, the dynamic changes of an appearance of the target biological cell due to coming into view or coming into a focal plane or a disappearance of the target biological cell due to out of view or out of the focal plane may affect the detection of prior art, but the present invention may continuously capture a plurality of image frames of the suspension in a time period and analyze the image frames, so the present invention can avoid the above mentioned effect of the dynamic changes and can utilize the dynamic changes to generate a dynamic changes history of each biological cell to obtain an objective and precise detecting result. In addition, the present invention may detect the target biological cell in each image frame of the suspension according to parameters such as pixel information, size, area, color or shape, etc, so the present invention can improve the accuracy of detection of the target biological cell. Because the present invention utilize the low-magnification optical image amplification device to continuously capture the image frames for sampling, wherein the sampling result may be timely analyzed, or may be stored and then be analyzed, the present invention may increase the sampling time of the target biological cell and increase the number of samples of the target biological cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
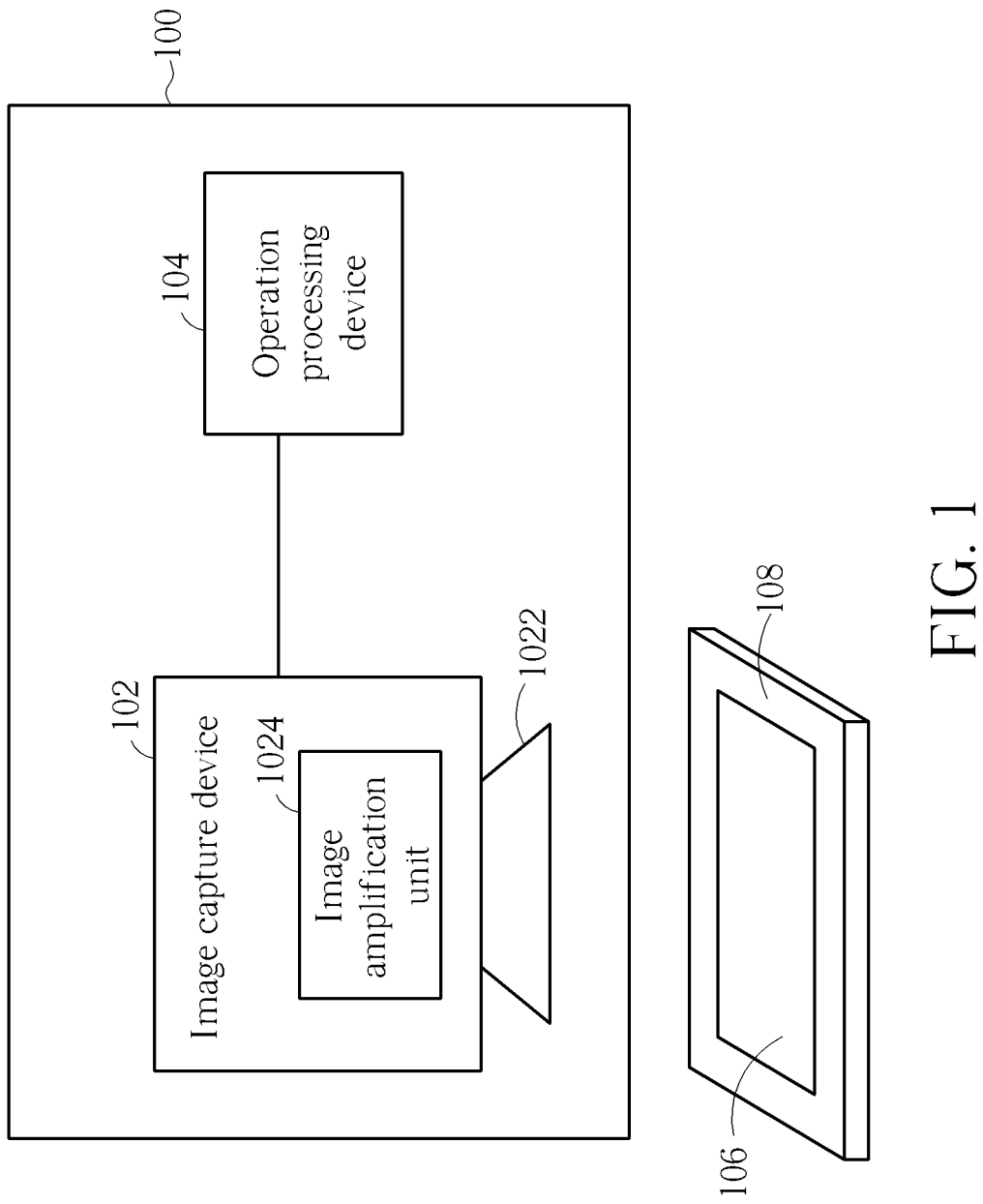
FIG. 1 is a block diagram of a device for automatically rapidly analyzing biological cells according to one embodiment of the present invention.

Please refer to FIG. 1. FIG. 1 is a block diagram illustrating a device 100 for automatically rapidly analyzing biological cells according to one embodiment of the present invention. The device 100 comprises an image capture device 102 and an operation processing device 104. The image capture device 102 comprises a low-magnification optical image amplification device 1022, wherein the image capture device 102 utilizes the low-magnification optical image amplification device 1022 to continuously capture a plurality of image frames (e.g. RGB image frames) of a suspension 106 including a plurality of biological cells according to a predetermined sampling time interval (e.g. $\frac{1}{30}$ of a second) within a predetermined sampling time, wherein the suspension 106 is introduced into a transparent observation platform 108 having a fixed volume, the suspension 106 may be a stock solution of biological cells without dilution or a biological cell suspension diluted according to a predetermined ratio, and the plurality of biological cells may be a plurality of erythrocytes, leucocytes, sperms or microbes. But the sampling time interval in the present invention is not limited to $\frac{1}{30}$ of a second. In addition, in another embodiment of the present invention, the suspension 106 may be a stock solution of biological cells without dilution or an isotonic solution diluted according to a predetermined ratio. Besides, the image capture device 102 may be a RGB image capture device, and the image capture device 102 further comprises an image amplification unit 1024, wherein the image amplification unit 1024 is configured to optically or digitally amplify the image frames of the suspension 106 captured by the image capture device 102. In addition, the image capture device 102 may transmit the image frames of the suspension 106 to the operation processing device 104 by wire transmission. But the image capture device 102 in the present invention is not limited to transmitting the image frames to the operation processing device 104 by wire transmission. The image capture device 102 may also transmit the image frames of the suspension 106 to the operation processing device 104 by wireless transmission.

The operation processing device 104 may utilize an image identification technology to detect a number of the plurality of biological cells in an image frame of the suspension 106 and static data (e.g. pixel information (e.g. RGB value, coordinates, etc.), size, area, color, shape, or coordinates of a center of each biological cell image) of each biological cell of the plurality of biological cells according to at least one parameter (e.g. pixel information, size, area, color or shape, etc.). Then, the operation processing device 104 may generate dynamic data (e.g. moving distance and moving speed of each biological cell within a predetermined time, or speed percentage corresponding to all biological cells in the image frame of the suspension 106) of each biological cell in the image frame of the suspension 106 according to the static data of each biological cell in the image frame of the suspension 106 and the static data of each biological cell in a previous image frame of the suspension 106. In addition, the operation procession device 104 may be a device comprising signal processing and floating-point operation processing unit, for example, a computer (server, desktop, laptop, etc.), a mobile phone, or a handheld device.

When the operation processing device 104 compares the static data of each biological cell in the image frame of the suspension 106 with the static data of each biological cell in the previous image frame of the suspension 106, a biological cell in the image frame of the suspension 106 is determined to be a biological cell in the previous image frame of the suspension 106, if a distance between coordinates of a center or an area of the biological cell in the image frame of the suspension 106 and coordinates of a center or an area of the biological cell in the previous image frame of the suspension 106 is less than a predetermined distance (e.g. size of the biological cell). If a distance between coordinates of a center or an area of a biological cell in the image frame of the suspension 106 and coordinates of a center or an area of all biological cells in the previous image frame of the suspension 106 is larger than the predetermined distance, the biological cell in the image frame of the suspension 106 is not relative to all biological cells in the previous image frame of the suspension 106. Therefore, the operation processing device 104 may obtain the dynamic data of moving/activity (e.g. moving distance and moving speed of each biological cell within the predetermined time, or speed percentage corresponding to all biological cells in the image frame of the suspension 106) of each biological cell in the image frame of the suspension 106, or may obtain data related to the biological cells in all continuous image frames of the suspension 106 captured within a sampling time (e.g. 5 seconds to 15 seconds), for example, an average number and an average size of the biological cells in each image frame of the suspension 106, or an average moving speed of the biological cells in each image frame. The sampling time in the present invention is not limited to 5 seconds to 15 seconds.

Then, the operation processing device 104 may generate a dynamic changes history (e.g. a time point of an appearance or a disappearance of the biological cell image, or a duration of the continuous appearance) of an appearance of the biological cells due to coming into view or coming into a focal plane, or a disappearance of the biological cells due to out of view or out of the focal plane according to the dynamic data of each biological cell obtained from the image frame of the suspension 106.

When the device 100 is applied to detection of biological cell agglutination, the operation processing device 104 may divide each image frame of the suspension 106 into a plurality of image blocks, and may utilize an image identification technology to detect a number of the biological cells in each image block of the plurality of image blocks. Then, the operation processing device 104 may calculate an average value, a standard deviation and a coefficient of variation of the number of the biological cells in all image blocks according to the number of the biological cells in each image block. When the coefficient of variation of the number of the biological cells in all image blocks is greater than a predetermined coefficient of variation, it means that the difference between the number of the biological cells in each image block is too large, and the biological cells in each image block are unevenly distributed, so agglutination of the biological cells in the image frame may be present. Then, the operation processing device 104 may calculate a number of the biological cells in the image block having a value greater than the average value plus one or a plurality of standard deviations, and compare with a total number of the biological cells in the image frame. Thus, the operation processing device 104 may calculate the status of agglutination (e.g. agglutination percentage, agglutination distance, average of agglutination distance, average of agglutination ratio) of the biological cells in the image frame of the suspension 106.

In addition, when the device 100 is applied to counting the number of the plurality of biological cells of the suspension 106, measuring the moving status of each biological cells of the plurality of biological cells, and detecting biological cell agglutination, the low-magnification optical image amplification device 1022 may be an objective lens with 10× (100× magnification). Thus, the more the number of the biological cells in the viewing unit of each image frame of the suspension 106, the more the number of the biological cells sampled by the low-magnification optical image amplification device 1022 of the image capture device 102. In the present invention, the magnification of the low-magnification optical image amplification device 1022 is not limited to 100× magnification.

In addition, when the device 100 is applied to detecting a type of the biological cells in the image frame of the suspension 106, the low-magnification optical image amplification device 1022 may be an objective lens with 40× (400× magnification). Thus, the number of samples in the same field of view of the image frame of the suspension 106 is large, the number of samples is small and the operation is simple and fast. In the present invention, the magnification of the low-magnification optical image amplification device 1022 is not limited to 400× magnification.

Figure 2:
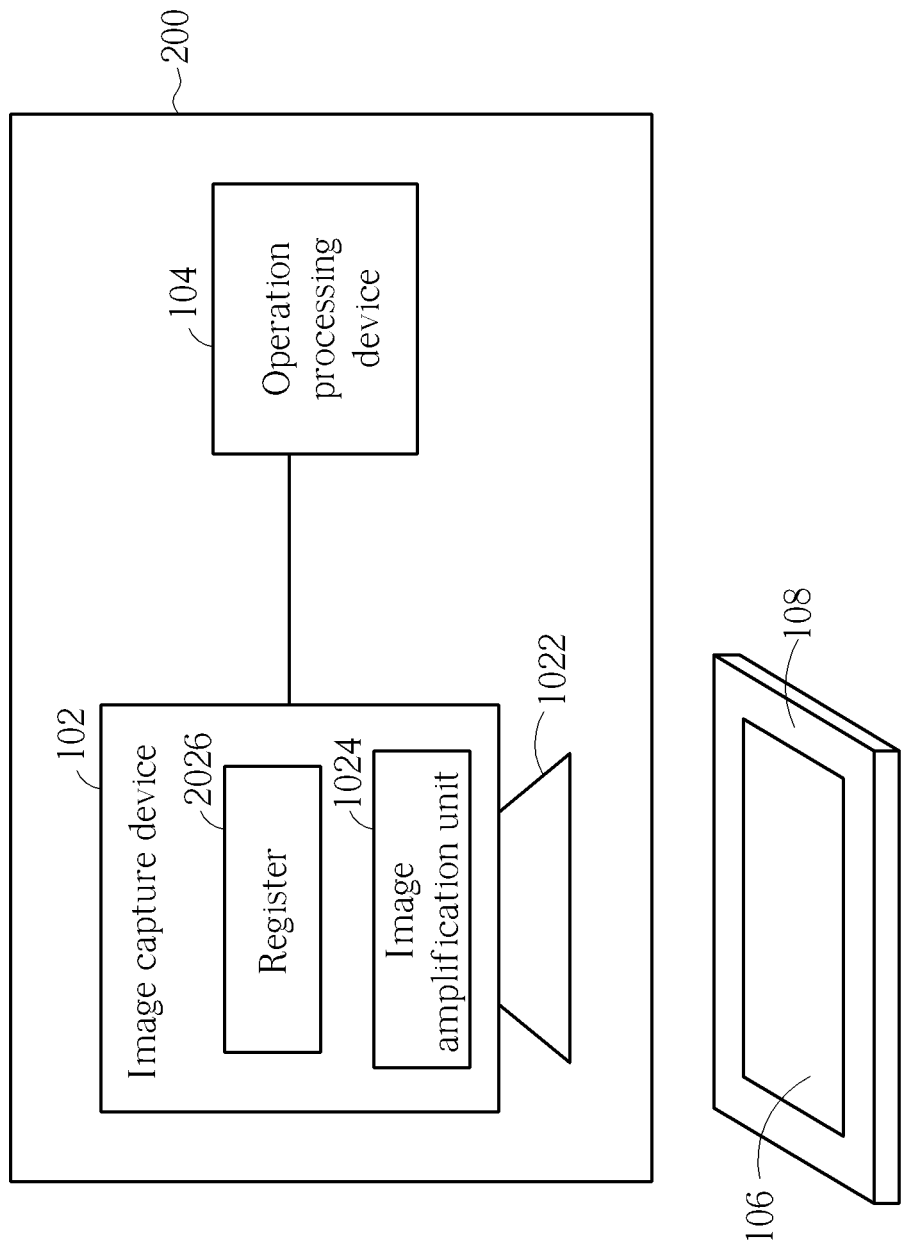
FIG. 2 is a block diagram of a device for automatically rapidly analyzing biological cells according to another embodiment of the present invention.

Please refer to FIG. 2. FIG. 2 is a block diagram illustrating a device 200 for automatically rapidly analyzing biological cells according to another embodiment of the present invention. As shown in FIG. 2, the difference between the device 200 and the device 100 is that the image capture device 102 of the device 200 further comprises a register 2026. When the image capture device 102 utilizes the low-magnification optical image amplification device 1022 to continuously capture the plurality of image frames of the suspension 106 including the plurality of biological cells according to the predetermined sampling time interval (e.g. 1/30 of a second), the register 2026 is configured to store the image frames of the suspension 106, and transmit the image frames of the suspension 106 to the operation processing device 104 by wireless transmission. In addition, the register 2026 may also transmit the image frames of the suspension 106 to the operation processing device 104 by wireless transmission. In addition, subsequent operational principles of the device 200 are the same as those of the device 100, so further description thereof is omitted for simplicity.

Figure 3:
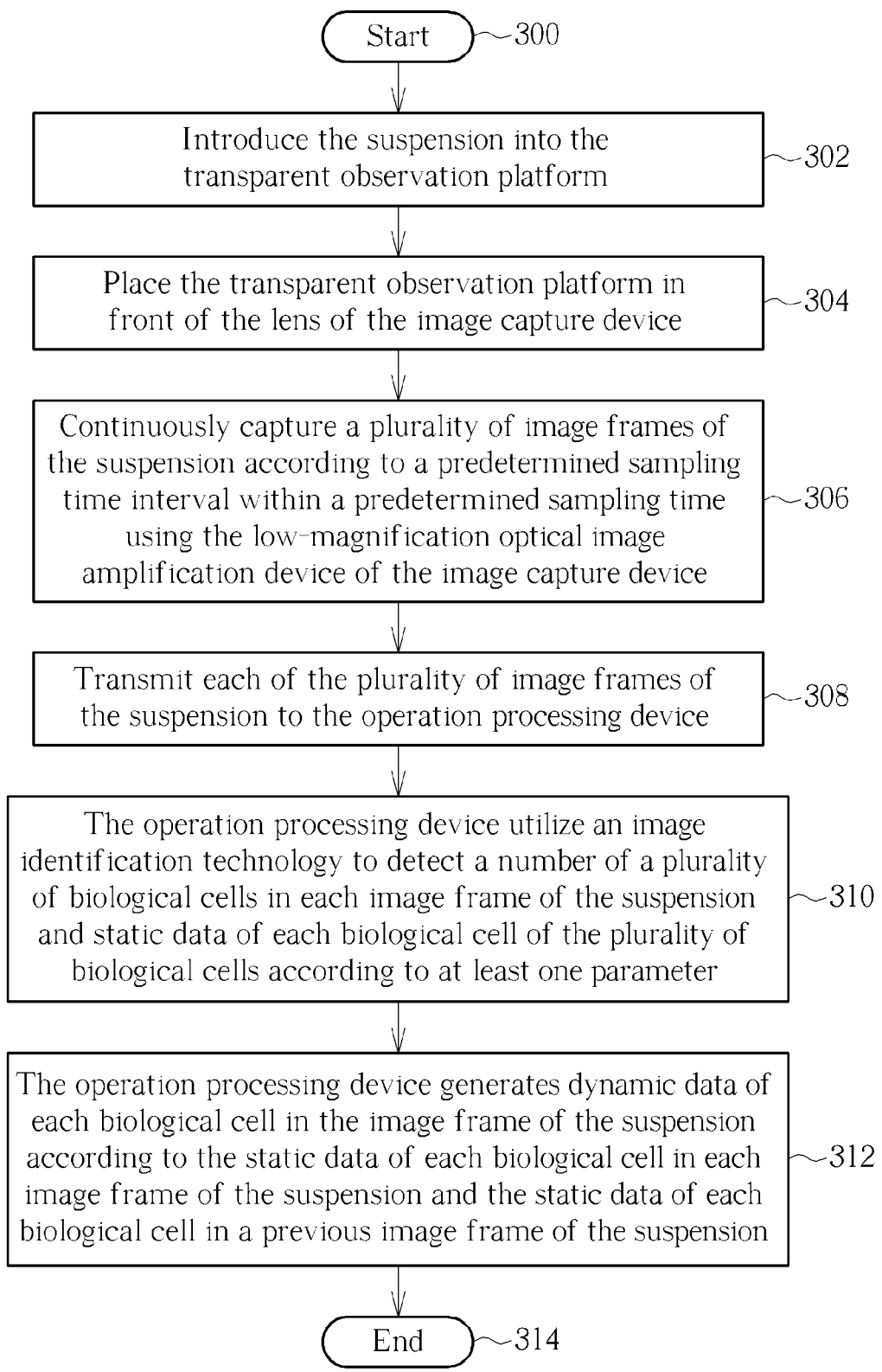
FIG. 3 is a flowchart of a method for automatically rapidly analyzing biological cells according to another embodiment of the present invention.

Please refer to FIG. 1, FIG. 2 and FIG. 3. FIG. 3 is a flowchart illustrating a method for automatically rapidly analyzing biological cells according to another embodiment of the present invention. The method in FIG. 3 is illustrated using the device 100 in FIG. 1 and the device 200 in FIG. 2. Detailed steps are as follows:

Step 300: Start.

Step 302: Introduce the suspension 106 into the transparent observation platform 108.

Step 304: Place the transparent observation platform 108 in front of the lens of the image capture device 102.

Step 306: Continuously capture a plurality of image frames of the suspension 106 according to a predetermined sampling time interval within a predetermined sampling time using the low-magnification optical image amplification device 1022 of the image capture device 102.

Step 308: Transmit each of the plurality of image frames of the suspension 106 to the operation processing device 104.

Step 310: The operation processing device 104 utilize an image identification technology to detect a number of a plurality of biological cells in each image frame of the suspension 106 and static data of each biological cell of the plurality of biological cells according to at least one parameter.

Step 312: The operation processing device 104 generates dynamic data of each biological cell in the image frame of the suspension 106 according to the static data of each biological cell in each image frame of the suspension 106 and the static data of each biological cell in a previous image frame of the suspension 106.

Step 314: End.

In step 302, the suspension 106 may be a stock solution of biological cells without dilution or a biological cell suspension diluted according to a predetermined ratio. In addition, in another embodiment of the present invention, the suspension 106 may be a stock solution of biological cells without dilution or an isotonic solution diluted according to a predetermined ratio. In step 304, the transparent observation platform 108 is placed in front of (below) the lens of the image capture device 102. But, in another embodiment of the present invention, because the image capture device 102 is the image capture device of a chatelier-type microscope, the image capture device 102 is located below, and the transparent observation platform 108 is above the image capture device 102. In step 306, the image capture device 102 utilizes the low-magnification optical image amplification device 1022 to continuously capture a plurality of image frames (e.g. RGB image frames) of a suspension 106 including a plurality of biological cells according to a predetermined sampling time interval (e.g. 1/30 of a second) within a predetermined sampling time, wherein the plurality of biological cells may be a plurality of erythrocytes, leucocytes, sperms or microbes. But the sampling time interval in the present invention is not limited to 1/30 of a second. Besides, the image capture device 102 may be a RGB image capture device, and the image capture device 102 further comprises an image amplification unit 1024, wherein the image amplification unit 1024 is configured to optically or digitally amplify the image frames captured by the image capture device 102. In step 308, the image capture device 102 may transmit the image frames of the suspension 106 to the operation processing device 104 by wire transmission. But the image capture device 102 in the present invention is not limited to transmitting the image frames to the operation processing device 104 by wire transmission. The image capture device 102 may also transmit the image frames of the suspension 106 to the operation processing device 104 by wireless transmission. In addition, in another embodiment of the present invention, as shown in FIG. 2, the register 2026 may store the image frames of the suspension 106 captured by the image capture device 102, and transmit the image frames of the suspension 106 to the operation processing device 104 by wireless transmission. In addition, the register 2026 may also transmit the image frames of the suspension 106 to the operation processing device 104 by wireless transmission. In step 310, the operation processing device 104 may utilize an image identification technology to detect a number of the plurality of biological cells in an image frame of the suspension 106 and static data (e.g. pixel information, size, area, color, shape, or coordinates of a center of each biological cell image) of each biological cell of the plurality of biological cells according to at least one parameter (e.g. pixel information, size, area, color or shape, etc.). In step 312, the operation processing device 104 may generate dynamic data (e.g. moving distance and moving speed of each biological cell within a predetermined time, or speed percentage corresponding to all biological cells in the image frame of the suspension 106) of each biological cell in the image frame of the suspension 106 according to the static data of each biological cell in the image frame of the suspension 106 and the static data of each biological cell in a previous image frame of the suspension 106. In step 312, when the operation processing device 104 compares the static data of each biological cell in the image frame of the suspension 106 with the static data of each biological cell in the previous image frame of the suspension 106, a biological cell in the image frame of the suspension 106 is determined to be a biological cell in the previous image frame of the suspension 106, if a distance between coordinates of a center or an area of the biological cell in the image frame of the suspension 106 and coordinates of a center or an area of the biological cell in the previous image frame of the suspension 106 is less than a predetermined distance (e.g. size of the biological cell). If a distance between coordinates of a center or an area of a biological cell in the image frame of the suspension 106 and coordinates of a center or an area of all biological cells in the previous image frame of the suspension 106 is larger than the predetermined distance, the biological cell in the image frame of the suspension 106 is not relative to all biological cells in the previous image frame of the suspension 106. Therefore, the operation processing device 104 may obtain the dynamic data of moving/activity (e.g. moving distance and moving speed of each biological cell within the predetermined time, or speed percentage corresponding to all biological cells in the image frame of the suspension 106) of each biological cell in the image frame of the suspension 106, or may obtain data related to the biological cells in all continuous image frames of the suspension 106 captured within a sampling time (e.g. 5 seconds to 15 seconds), for example, an average number and an average size of the biological cells in each image frame of the suspension 106, or an average moving speed of the biological cells in each image frame. Then, the operation processing device 104 may generate a dynamic changes history (e.g. a time point of an appearance or a disappearance of the biological cell image, or a duration of the continuous appearance) of an appearance of the biological cells due to coming into view or coming into a focal plane, or a disappearance of the biological cells due to out of view or out of the focal plane according to the dynamic data of each biological cell obtained from the image frame of the suspension 106.

Figure 4:
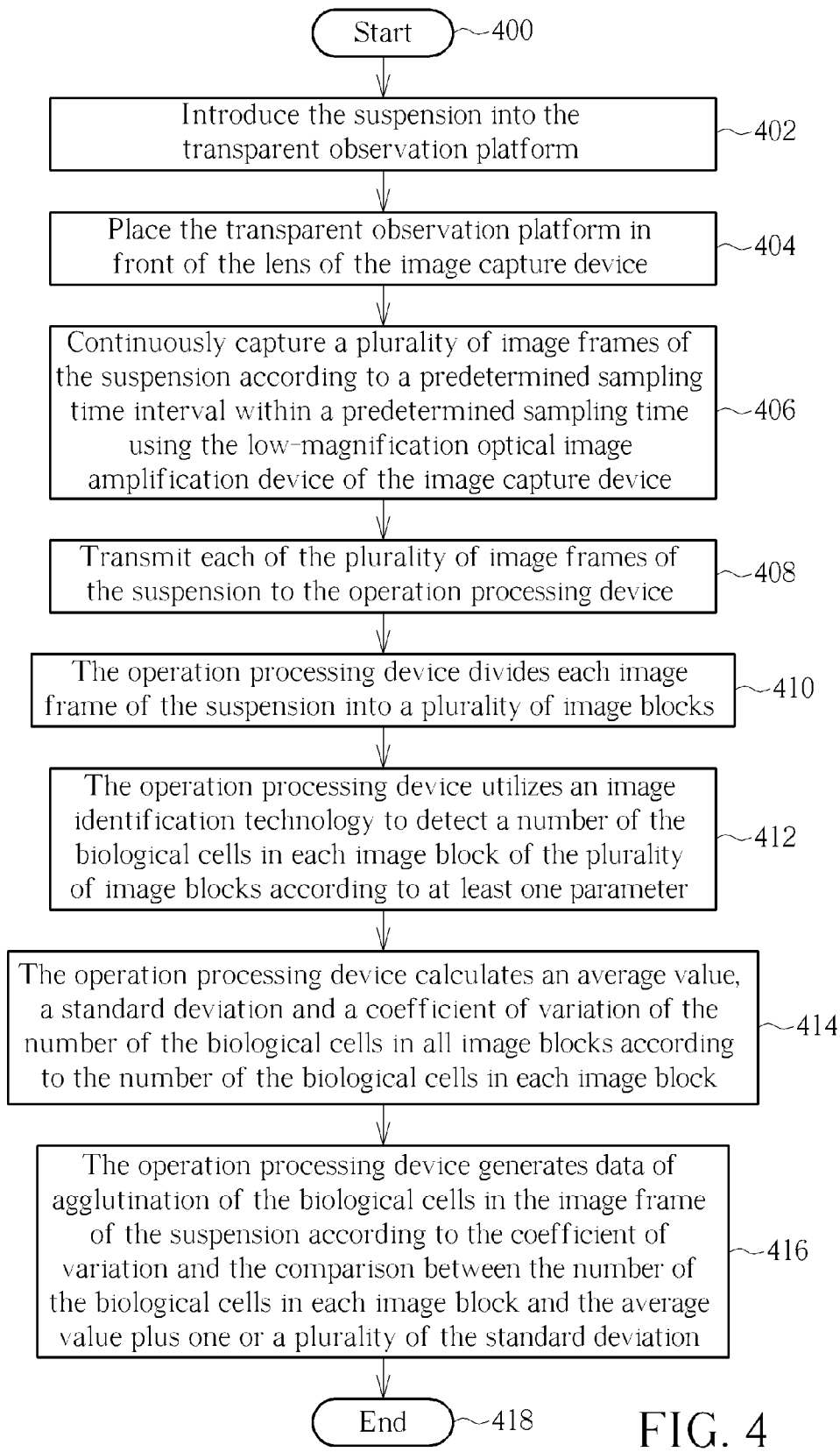
FIG. 4 is a flowchart of a method for automatically rapidly analyzing biological cells according to another embodiment of the present invention.

Please refer to FIG. 1, FIG. 2 and FIG. 4. FIG. 4 is a flowchart illustrating a method for automatically rapidly analyzing biological cells according to another embodiment of the present invention. The method in FIG. 4 is illustrated using the device 100 in FIG. 1 and the device 200 in FIG. 2. Detailed steps are as follows:

Step 400: Start.

Step 402: Introduce the suspension 106 into the transparent observation platform 108.

Step 404: Place the transparent observation platform 108 in front of the lens of the image capture device 102.

Step 406: Continuously capture a plurality of image frames of the suspension 106 according to a predetermined sampling time interval within a predetermined sampling time using the low-magnification optical image amplification device 1022 of the image capture device 102.

Step 408: Transmit each of the plurality of image frames of the suspension 106 to the operation processing device 104.

Step 410: The operation processing device 104 divides each image frame of the suspension 106 into a plurality of image blocks.

Step 412: The operation processing device 104 utilizes an image identification technology to detect a number of the biological cells in each image block of the plurality of image blocks according to at least one parameter.

Step 414: The operation processing device 104 calculates an average value, a standard deviation and a coefficient of variation of the number of the biological cells in all image blocks according to the number of the biological cells in each image block.

Step 416: The operation processing device 104 generates data of agglutination of the biological cells in the image frame of the suspension 106 according to the coefficient of variation and the comparison between the number of the biological cells in each image block and the average value plus one or a plurality of the standard deviation.

Step 418: End.

The differences between the embodiment of FIG. 4 and the embodiment of FIG. 3 are that in step 410, the operation processing device 104 may divide an image frame of the suspension 106 into a plurality of image blocks; in step 412, the operation processing device 104 utilizes the image identification technology to detect the number of the biological cells in each image block of the plurality of image blocks; in step 414, the operation processing device 104 calculates the average value, the standard deviation and the coefficient of variation of the number of the biological cells in all image blocks according to the number of the biological cells in each image block; in step 416, when the coefficient of variation is greater than a predetermined coefficient of variation, it means that the difference between the number of the biological cells in each image block is too large, and the biological cells in each image block are unevenly distributed, so agglutination of the biological cells in the image frame may be present. Then, the operation processing device 104 may calculate a number of the biological cells in the image block having a value greater than the average value plus one or a plurality of standard deviations, and compare with a total number of the biological cells in the image frame of the suspension 106. Thus, the operation processing device 104 may calculate the status of agglutination (e.g. agglutination percentage, agglutination distance, average of agglutination distance, average of agglutination ratio) of the biological cells in the image frame of the suspension 106. In addition, subsequent operational principles of the embodiment of FIG. 4 are the same as those of the embodiment of FIG. 3, so further description thereof is omitted for simplicity.

To sum up, the device for automatically rapidly analyzing biological cells and the method for automatically rapidly analyzing biological cells provided in the present invention utilize the low-magnification optical image amplification device of the image capture device to continuously capture the plurality of image frames of the suspension according to the predetermined sampling time interval within the predetermined sampling time, and utilize the image identification technology to detect the number of the plurality of biological cells in each image frame of the suspension and the static data of each biological cell of the plurality of biological cells according to at least one parameter. The operation processing device may generate the dynamic data of each biological cell in the image frame of the suspension according to the static data of each biological cell in each image frame of the suspension and the static data of each biological cell in the previous image frame of the suspension, or the operation processing device calculates the average value, the standard deviation and the coefficient of variation of the number of the biological cells in all image blocks according to the number of the biological cells in each image block of the image frame of the suspension. Then, the operation processing device may determine whether the biological cells in each image block agglutinate according to the coefficient of variation and the comparison between the number of the biological cells in each image block and the average value plus one or a plurality of the standard deviation. Compared with prior art, the dynamic changes of an appearance of the target biological cell due to coming into view or coming into a focal plane or a disappearance of the target biological cell due to out of view or out of the focal plane may affect the detection of prior art, but the present invention may continuously capture a plurality of image frames of the suspension in a time period and analyze the image frames, so the present invention can avoid the above mentioned effect of the dynamic changes and can utilize the dynamic changes to generate a dynamic changes history of each biological cell to obtain an objective and precise detecting result. The present invention may detect the target biological cell in each image frame of the suspension according to parameters such as pixel information, size, area, color or shape, etc, so the present invention can improve the accuracy of detection of the target biological cell. Because the present invention utilize the low-magnification optical image amplification device to continuously capture the image frames for sampling, wherein the sampling result may be timely analyzed, or may be stored and then be analyzed, the present invention may increase the sampling time of the target biological cell and increase the number of samples of the target biological cell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for automatically rapidly analyzing biological cells, comprising:
    continuously capturing a plurality of image frames of a suspension including a plurality of biological cells according to a predetermined time interval within a predetermined time using a low-magnification optical image amplification device of a image capture device;
    transmitting each of the plurality of image frames to an operation processing device;
    the operation processing device utilizing an image identification technology to detect a number of the plurality of biological cells in an image frame of the plurality of image frames and a static data of each biological cell of the plurality of biological cells according to at least one parameter; and
    the operation processing device generating a dynamic data of each biological cell in the image frame according to the static data of each biological cell in the image frame and the static data of each biological cell in a previous image frame;
    wherein the operation processing device generating a dynamic changes history of an appearance of a biological cell image due to coming into view or coming into a focal plane and a disappearance of the biological cell image due to out of view or out of the focal plane according to the dynamic data of each biological cell.

2. The method of claim 1, wherein the static data of the biological cell comprises size, color, area, shape of the biological cell and pixel information of the biological cell image; the dynamic data of the biological cell comprises moving distance, moving direction and moving speed of the biological cell; and the dynamic changes history of the biological cell comprises a time point of the appearance, a time point of the disappearance and a duration of a continuous appearance of the biological cell image.

3. The method of claim 1, further comprising:
introducing the suspension into a transparent observation platform; and
placing the transparent observation platform in front of lens of the image capture device.

4. The method of claim 1, wherein the suspension is a stock solution of biological cells without dilution or a biological cell suspension diluted according to a predetermined ratio.

5. The method of claim 1, wherein the suspension is a stock solution of biological cells without dilution or an isotonic solution diluted according to a predetermined ratio.

6. The method of claim 5, wherein the isotonic solution keeps activity of the plurality of biological cells.

7. The method of claim 1, wherein the image capture device is a RGB image capture device, and the image capture device comprises an image amplification unit configured to optically or digitally amplify the image frame.

8. The method of claim 1, wherein transmitting each of the plurality of image frames to the operation processing device comprises the image capture device transmitting each of the plurality of image frames to the operation processing device by wire transmission or by wireless transmission.

9. The method of claim 1, further comprising:
the image capture device transmitting the plurality of image frames to a register.

10. The method of claim 9, wherein transmitting each of the plurality of image frames to the operation processing device comprises the register transmitting each of the plurality of image frames to the operation processing device by wire transmission or by wireless transmission.

11. A method for automatically rapidly analyzing biological cells, comprising:
continuously capturing a plurality of image frames of a suspension including a plurality of biological cells according to a predetermined time interval within a predetermined time using a low-magnification optical image amplification device of a image capture device;
transmitting each of the plurality of image frames to an operation processing device;
the operation processing device dividing an image frame into a plurality of image blocks;
the operation processing device utilizing an image identification technology to detect a number of biological cells in each image block of the plurality of image blocks according to at least one parameter;
the operation processing device calculating an average value, a standard deviation and a coefficient of variation of the number of the biological cells in all image blocks according to the number of the biological cells in all image block of the image frame; and
the operation processing device generating a data of agglutination of the biological cells in the image frame according to the coefficient of variation and a difference between the number of the biological cells in each image block and the average value plus one or a plurality of the standard deviation.

12. The method of claim 11, further comprising:
introducing the suspension into a transparent observation platform; and
placing the transparent observation platform in front of lens of the image capture device.

13. The method of claim 11, wherein the suspension is a stock solution of biological cells without dilution or a biological cell suspension diluted according to a predetermined ratio.

14. The method of claim 11, wherein the suspension is a stock solution of biological cells without dilution or an isotonic solution diluted according to a predetermined ratio.

15. The method of claim 14, wherein the isotonic solution keeps activity of the plurality of biological cells.

16. The method of claim 11, wherein the image capture device is a RGB image capture device, and the image capture device comprises an image amplification unit configured to optically or digitally amplify the image frame.

17. The method of claim 11, wherein transmitting each of the plurality of image frames to the operation processing device comprises the image capture device transmitting each of the plurality of image frames to the operation processing device by wire transmission or by wireless transmission.

18. The method of claim 11, further comprising:
the image capture device transmitting the plurality of image frames to a register.

19. The method of claim 18, wherein transmitting each of the plurality of image frames to the operation processing device comprises the register transmitting each of the plurality of image frames to the operation processing device by wire transmission or by wireless transmission.

20. A device for automatically rapidly analyzing biological cells, comprising:
an image capture device, comprising a low-magnification optical image amplification device, wherein the image capture device is configured to utilize the low-magnification optical image amplification device to continuously capture a plurality of image frames of a suspension including a plurality of biological cells according to a predetermined time interval within a predetermined time; and
an operation processing device configured to utilize an image identification technology to detect a number of the plurality of biological cells in an image frame of the plurality of image frames and a static data of each biological cell of the plurality of biological cells according to at least one parameter, generate a dynamic data of each biological cell in the image frame according to the static data of each biological cell in the image frame and the static data of each biological cell in a previous image frame, and generate a dynamic changes history of an appearance of a biological cell image due to coming into view or coming into a focal plane and a disappearance of the biological cell image due to out of view or out of the focal plane according to the dynamic data of each biological cell;
wherein the image capture device is further configured to transmit the image frame to the operation processing device.

21. The device of claim 20, wherein the static data of the biological cell comprises size, color, area, shape of the biological cell and pixel information of the biological cell image; the dynamic data of the biological cell comprises moving distance, moving direction and moving speed of the biological cell; and the dynamic changes history of the biological cell comprises a time point of the appearance, a time point of the disappearance and a duration of a continuous appearance of the biological cell image.

22. The device of claim 20, wherein the operation processing device is further configured to divide an image frame into a plurality of image blocks, utilize an image identification technology to detect a number of biological cells in each image block of the plurality of image blocks according to at least one parameter, calculate an average value, a standard deviation and a coefficient of variation of the number of the biological cells in all image blocks according to the number of the biological cells in the image block, and generate a data of agglutination of the biological cells in the image frame according to the coefficient of variation and a difference between the number of the biological cells in each image block and the average value plus one or a plurality of the standard deviation.

23. The device of claim 20, wherein the suspension is introduced into a transparent observation platform, and the transparent observation platform is placed in front of lens of the image capture device.

24. The device of claim 20, wherein the suspension is a stock solution of biological cells without dilution or a biological cell suspension diluted according to a predetermined ratio.

25. The device of claim 20, wherein the suspension is a stock solution of biological cells without dilution or an isotonic solution diluted according to a predetermined ratio.

26. The device of claim 20, wherein the image capture device is a RGB image capture device, and the image capture device comprises an image amplification unit configured to optically or digitally amplify the image frame.

27. The device of claim 20, wherein the image capture device transmits the image frame to the operation processing device by wire transmission or by wireless transmission.

28. The device of claim 20, wherein the image capture device further comprises:
   a register configured to store the image frame and transmit the image frame to the operation processing device by wire transmission or by wireless transmission.

\* \* \* \* \*